United States Patent
Kita et al.

[11] Patent Number: 5,886,895
[45] Date of Patent: Mar. 23, 1999

[54] PLANT UTILITY OPTIMIZING METHOD AND AN OPTIMIZING SYSTEM

[75] Inventors: Yoichi Kita, Yokohama; Tohru Kamibayashi, Chigasaki, both of Japan

[73] Assignee: Kabushiki Kaisha Toshiba, Kawasaki, Japan

[21] Appl. No.: 640,949

[22] Filed: Jul. 1, 1996

[30] Foreign Application Priority Data

Sep. 26, 1994 [JP] Japan ................................. 6-229367
Sep. 29, 1994 [JP] Japan ................................. 6-235703

[51] Int. Cl.$^6$ ............................................. G05B 15/02
[52] U.S. Cl. ................... 364/148.01; 364/149; 364/151; 364/152; 364/148.08; 364/528.23
[58] Field of Search ............................ 364/138, 148.01, 364/148.08, 149, 151, 152, 528.23

[56] References Cited

U.S. PATENT DOCUMENTS

| | | | |
|---|---|---|---|
| 4,069,675 | 1/1978 | Adler et al. | 60/667 |
| 4,577,280 | 3/1986 | Putman | 364/528.17 |
| 4,604,714 | 8/1986 | Putman et al. | 364/494 |
| 4,628,462 | 12/1986 | Putman | 364/494 |
| 4,805,114 | 2/1989 | Putman et al. | 364/494 |
| 5,159,562 | 10/1992 | Putman et al. | 364/528.23 |
| 5,347,466 | 9/1994 | Nichols et al. | 364/492 |
| 5,517,424 | 5/1996 | Marcelle et al. | 364/494 |

FOREIGN PATENT DOCUMENTS

| | | |
|---|---|---|
| 560263 A2 | 9/1993 | European Pat. Off. |
| 2568939 | 2/1986 | France |
| 62-170709 | 7/1987 | Japan |
| 62-212701 | 9/1987 | Japan |
| 2-49904 | 2/1990 | Japan |
| 2-264303 | 10/1990 | Japan |
| 3-17204 | 2/1991 | Japan |
| 3-188562 | 8/1991 | Japan |
| 4-272407 | 9/1992 | Japan |

OTHER PUBLICATIONS

Y. Kita, "Optimal Operating System for Industrial Power & Steam Energy Management", Japan Association for the Pulp and Paper Industry, 49(1):79–85 (1989).

*Primary Examiner*—Edward R. Cosimano
*Attorney, Agent, or Firm*—Finnegan, Henderson, Farabow, Garrett & Dunner, L.L.P.

[57] ABSTRACT

For calculating optimum operation parameters of a BTG plant including a plurality of boilers having a linear input/output characteristic between an incoming fuel and steam output and a plurality of turbines having a non-convex input/output characteristic between the incoming steam which is an output of the boiler and power output, a dynamic programming process is performed twice and a linear programming process is performed once with respect to the steam and power to find, as an optimum solution, the power output of the turbines. Finally, an optimum solution is found in which a total fuel cost is minimized.

8 Claims, 16 Drawing Sheets

| STEAM AMOUNT OF L3 | 0 | ... | M1+M2+M4 |
|---|---|---|---|
| OPTIMUM STEAM DIVISION (s1, s2, s4) | (0, 0, 0) | ... | (M1, M2, M4) |
| OUTPUT POWER | 0 | ... | p1(M1)+p2(M2)+p4(M4) |

FIG. 8

| STEAM AMOUNT OF L4 | 0 | ... | M3+M5 |
|---|---|---|---|
| OPTIMUM STEAM DIVISION (s3, s5) | (0, 0) | ... | (M3, M5) |
| OUTPUT POWER | 0 | ... | p3(M3)+p5(M5) |

FIG. 9

| u | 0 | ... | uM |
|---|---|---|---|
| STEAM AMOUNT OF L3 | 0 | ... | M1+M2+M4 |
| OPTIMUM STEAM DIVISION (s1, s2, s4) | (0, 0, 0) | ... | (M1, M2, M4) |
| OUTPUT POWER | 0 | ... | p1(M1)+p2(M2)+p4(M4) |

FIG. 10

| v | 0 | ... | vM |
|---|---|---|---|
| STEAM AMOUNT OF L4 | 0 | ... | M3+M5 |
| OPTIMUM STEAM DIVISION (s3, s5) | (0, 0) | ... | (M3, M5) |
| OUTPUT POWER | 0 | ... | p3(M3)+p5(M5) |

FIG. 11

| u | Um | ... | UM |
|---|---|---|---|
| STEAM AMOUNT OF L3 | L3ℓ | ... | L3u |
| OPTIMUM STEAM DIVISION (s1, s2, s4) | (sm1, sm2, sm4) | ... | (sM1, sM2, sM4) |
| OUTPUT POWER | Em3 | ... | EM3 |

FIG. 12

| v | Vm | ... | VM |
|---|---|---|---|
| STEAM AMOUNT OF L4 | L4ℓ | ... | L4u |
| OPTIMUM STEAM DIVISION (s3, s5) | (sm3, sm5) | ... | (sM3, sM5) |
| OUTPUT POWER | Em4 | ... | EM4 |

FIG. 13

| TOTAL INPUT STEAM AMOUNT (IN TERMS OF HIGH PRESSURE) | Um+Vm | ... | UM+VM |
|---|---|---|---|
| (STEAM AMOUNT OF L3, STEAM AMOUNT OF L4) | (L3ℓ, L4ℓ) | ... | (L3u, L4u) |
| OPTIMUM STEAM DIVISION (s1,........., s5) | (sm1,..., sm5) | ... | (sM1,..., sM5) |
| TOTAL OUTPUT POWER | Em3+Em4 | ... | EM3+EM4 |

FIG. 15

| TOTAL INPUT STEAM AMOUNT (IN TERMS OF HIGH PRESSURE) | Um+Vm | ... | UM+VM |
|---|---|---|---|
| (STEAM OF L3, STEAM OF L4) | (L3ℓ, L4ℓ) | ... | (L3u, L4u) |
| STEAM DIVISION (s1,........., s5) | (sm1,..., sm5) | ... | (sM1,..., sM5) |
| TOTAL OUTPUT POWER | Em3+Em4 | ... | EM3+EM4 |
| FUEL DIVISION (f1,......,f4) | (*, *, *, *) | ... | (*, *, *, *) |
| TOTAL FUEL COST | * | ... | * |

FIG. 16

| TOTAL INPUT STEAM AMOUNT (IN TERMS OF HIGH PRESSURE) | Um+Vm | ... | UM+VM |
|---|---|---|---|
| (STEAM OF L3, STEAM OF L4) | (L3ℓ, L4ℓ) | ... | (L3u, L4u) |
| STEAM DIVISION (s1,........., s5) | (sm1,..., sm5) | ... | (sM1,..., sM5) |
| TOTAL OUTPUT POWER | Em3+Em4 | ... | EM3+EM4 |
| FUEL DIVISION (f1,......,f4) | (*, *, *, *) | ... | (*, *, *, *) |
| TOTAL FUEL COST | * | ... | * |
| TOTAL COST | * | ... | * |

FIG. 17

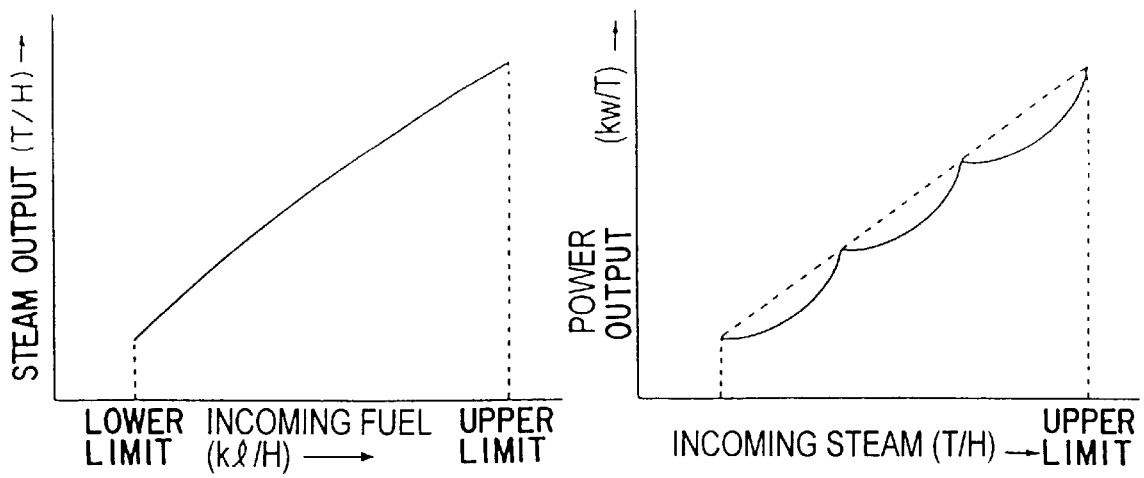
FIG. 20
PRIOR ART
FIG. 21
PRIOR ART
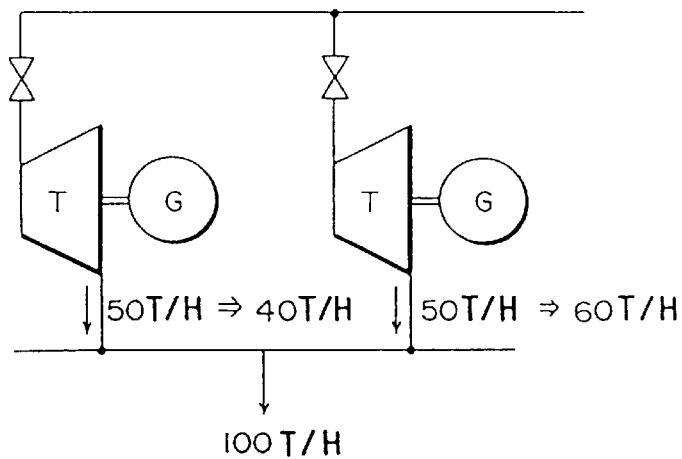
FIG. 22
PRIOR ART
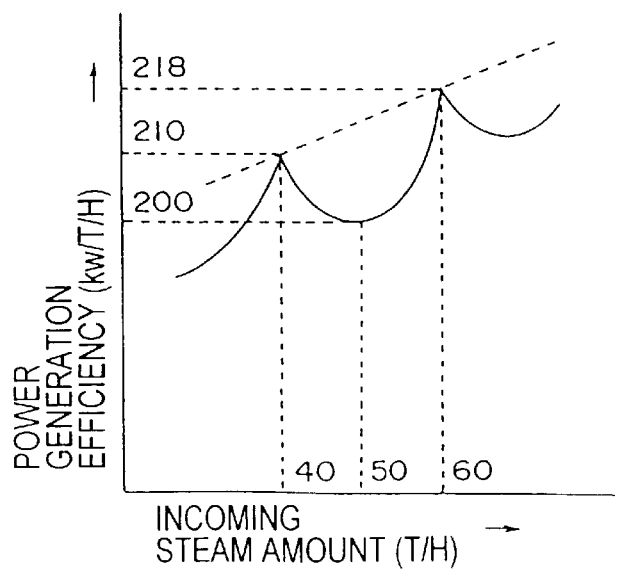
FIG. 23
PRIOR ART

PLANT UTILITY OPTIMIZING METHOD AND AN OPTIMIZING SYSTEM

BACKGROUND OF THE INVENTION

The present invention relates to an apparatus and method for optimizing a Boiler-Turbine-Generator plant.

In a factory using boiler-turbine-generator energy plant (hereinafter referred to as a BTG plant) it is desired to operate the plant at an optimum condition in which an operating cost is minimum.

FIG. 18 shows a conceptual diagram of the BTG plant and FIG. 19 shows a common composition of the BTG plant in the industry field.

As shown in FIG. 18, plural (Xm) steam turbines T (hereinafter referred to simply as the turbines) are driven by the steam generated by boilers B using fuel such as oil, gas, coal, recovered black liquor, etc. The turbines T respectively drive generators G to generate electric power. The generated power from the generators G is supplied to process load. The reduced-pressure steam through the turbines T is supplied to process load. If the power from the generators G is not sufficient to meet the power demand of the process load, commercial electric power is also supplied to the load.

The common BTG plant comprises, as shown in FIG. 19, boilers B01 to B04, turbines T01 to T04, and process loads (steam) H and L. The boilers B01 and B02 use the easy output-controllable fuel such as oil, gas, etc., whereas the boilers B03 and B04 use the commercial fuel such as coal, recovered black liquor, etc.

The high-pressure steam generated by the boilers B01 and B02 is supplied to the high-pressure steam header SL, and the high-pressure steam generated by the boilers B03 and B04 is supplied to the high-pressure steam header SH. Turbines T01 and T02 are driven by the high-pressure steam supplied from the steam header SH and drive the generators G01 and G02. The turbines T03 and T04 are driven by the high-pressure steam supplied from the steam header SL and drive the generators G03 and G04. The extracted steam from the turbines T01 and T02 is supplied to a low-pressure steam header DH and is further supplied to the process load H. The extracted steam from the turbines T03 and T04 is supplied to a low-pressure steam header DL and is further supplied to the process load L. Here, the pressure of the high-pressure steam header SH is higher than that of the high-pressure steam header SL, while the pressure of the high-pressure steam supply header DH is higher than that of the high-pressure steam supply header DL.

A pressure-reducing valve RPV1 is connected with the steam headers SH and SL. A pressure-reducing valve RPV2 is connected with the steam headers DH and DL.

In the BTG plant, the incoming fuel/steam output characteristic of the boiler B is near-proportional as shown in FIG. 20.

Meanwhile, the incoming steam/power output characteristic of the turbine T has a non-linear characteristic called a valve point characteristic having several dents, as shown in FIG. 21. The connected point between the dents is called as a valve point. While the turbine performance curve submitted by the turbine manufacturer is drawn as an envelope on peak points (valve points)—a broken line —, this envelope line has differences from the actual curve—a solid line—in FIG. 21.

Optimizing operation of the BTG plant means operating at the optimum operation condition in which a steam division from the boilers B to the turbines T and an electric power supplied from the commercial power source to the process load are varied so that a total cost including a fuel cost and a cost for buying the electric power is minimum. The effect of optimizing operation will be explained in FIGS. 22 and 23.

It is assumed that, in FIG. 22, two turbines of the same characteristic are driven by a given total amount of steam (100 T/H).

While the steam is equally divided to the two turbines, i.e., a 50 T/H each, the total power output becomes 200×50+200×50=20,000 kW as shown in FIG. 23.

While the steam is divided to the two turbines, one at 40 T/H and the other at 60 T/H, the total power output becomes 210×40+218×60=21,480 kW as shown in FIG. 23.

Thus, 1480 kW (7.4%) more power output can be generated by varying the division ratio of the steam to the turbines.

The optimizing system, utilizing a mathematical formula which models the BTG plant, finds a cost minimum steam and power division, which meets the process load demands.

FIG. 24 is a function block diagram showing a typical BTG plant optimizing system. The system comprises a plant model defining section 32 and a total energy cost minimizing calculating section 31.

In section 32, the characteristics and the operable limits of turbines, boilers, pressure-reducing valves, etc., are defined as the constituent elements of the BTG plant model, as well as mass balance formula of power or stream in each pressure (high-pressure and low-pressure), which are supplied to the total energy cost minimizing point calculating section 31 as a premise conditions.

And next, process demands are given to section 31. Then, the calculation section 31 finds an optimum power and steam division ratio of the boiler/turbines satisfying the power/steam demands by using a linear programming (LP) scheme or a non-linear programming (NLP) scheme.

The conventional schemes such as LP and NLP have following weak points.

LP can be applied only to a linear model. It is necessary, therefore, to approximate a non-linear actual plant model to a linear model. Consequently, the accuracy of a solution is lowered through such approximation, so that the cost saving effect is small.

NLP can solve the multi-dimensional problem and, therefore, handle the non-linear plant model. However, when the model is non-convex, only a local optimum solution can be obtained.

Since a valve point characteristic of the turbine is non-linear and has multi-peaks, the non-linear programming scheme merely finds a local optimum point in the vicinity of an initial value of calculation, but cannot find the true optimum point (global optimum point), as shown in FIG. 25.

In order to obtain the true optimum point by using the NLP, the initial value and search method have to be modified to well-fit to the model. However, the search logic becomes more complicated when aiming at an optimum solution, and lots of time and labor are taken in tuning calculation parameters.

In searching the true optimum point by NLP, it is necessary to properly determine the initial value and search area.

The initial value is one of calculating parameters which determines a starting point of calculation. The following method is often used to determine the initial point.

i) using the current operating point
ii) utilizing a solution obtained by the LP In searching method, the Lagrange multiplication method-plus-conjugate gradient method often used as NLP algorithm, the search area has to be tuned so that only a single peak or dent is included in the area.

FIG. 26 shows a relation among the linear solution, non-linear solution and true optimum solution.

In FIG. 26, the solution obtained by LP is located at "D". The solution obtained by the linear approximating method is located at "D'", but the solution on the true model is located at "D"".

When the initial value is "K" in NLP, a local minimal point "A" is obtained in the vicinity of the starting point "K". Being greater than a true minimum point "T", "A" is a local minimum point.

"B" is an intentionally moved point by "L2" from the local minimum point "A" to find a better solution. If point "B" is located in a lower position than point "A", the minimum point is shifted to the point "B". A local minimum point "T" is obtained in the vicinity of point "B".

However, a point "C" spaced apart by "L1" is located in a higher position than point "A", there is no shift of the optimum point.

A proper search method for one model is not always proper to other models. Therefore, NLP's solution does not guarantee to reach a true optimum point "T".

Since NLP is based on such assumption that the model has a convex characteristic, it cannot solve the optimizing problem unless it is known whether there is a peak/dent (single) and whether the position of the peak/dent is located.

NLP only can find the local optimum point for a multi-peak problem containing a plural peak/dent such as non-convex characteristics in the case of the turbine control valve.

In the conventional optimizing system, therefore, the operation is done at the local optimum point and there is room for efficiency improvement up to the true optimum point.

NLP method is difficult to tune its calculation parameters such as initial value, search area, for the user-operator with no special knowledge of optimization computation. Therefore, it is impossible for the user-operator to do the system modification of the plant model corresponding to the BTG plant change.

Mentioned above, conventional optimizing systems for BTG plant operation only obtains a linear solution with poor accuracy or a non-linear solution (local optimum solution). Furthermore, it is difficult to, in NLP, tune the calculation parameters such as the initial value and search area.

BRIEF SUMMARY OF THE INVENTION

Accordingly, a first object of the present invention is to provide a plant utility optimizing method and/or apparatus which can satisfy process side demands for the plant and accurately find an optimum operating point considering the non-convex plant characteristics.

A second object of the present invention is to provide a plant utility optimizing method and/or apparatus which can obviate the need to tune calculation parameters and, in addition, enables the user-operator with no special knowledge of optimization to do the system modification of the plant model corresponding to the BTG plant change.

According to the present invention, there is provided a utility optimizing method for calculating optimum operation parameters of a plant including a plurality of first plant elements having a linear input/output characteristic with first physical amounts as an input and second physical amounts as an output and a plurality of second plant elements having a non-convex input/output characteristic with the second physical amounts output from the first plant elements as an input and third physical amounts as an output, the method comprising a first step of calculating a division of the second physical amounts to the second plant elements by using a dynamic programming to maximize the total of the third physical amounts output from the second plant elements associated with the total of the second physical amounts in a predetermined range satisfying a first demand for the second physical amounts; a second step of calculating a division of the second physical amounts to the second plant elements by using a dynamic programming based on a set of the total of the second physical amounts, total of the third physical amounts and division of the second physical amounts to the second plant elements obtained by the first step at each of the second physical amounts to maximize the total of the third physical amounts output from said all the second plant elements and corresponding to the total of the second physical amounts to all the second plant elements; a third step of calculating, by using one of a linear programming or a nonlinear programming, the second physical amounts input to the respective second plant elements and a first cost required to supply the first physical amounts with respect to each set of the total of the second physical amounts, total of the third physical amounts and division of the second physical amounts to the second plant elements obtained by the second step; and a fourth step of, based on each set of the total of the third physical amounts and first cost obtained at the third step, calculating a second cost required to receive a power which corresponds to a shortage in a second power demand for the total of the third physical amounts from an external source to calculate a total cost for each set and obtaining, as an optimum solution, each value belonging to a set in which the total cost is minimized.

According to the present invention, there is provided another utility optimizing method for calculating optimum operation parameters of a power generation plant including a plurality of boilers, a plurality of turbines operated by steams generated from the boilers and generators driven by the respective turbines to generate electric power in which the electric power is supplied to electric power loads while the steams generated from the respective turbines are supplied to steam loads via a plurality of turbine discharge systems, the method comprising a first step of calculating a steam division to the respective turbine by using a dynamic programming to maximize the total of the generation powers of the turbines connected to the same turbine discharge system corresponding to the steam amounts in a predetermined range satisfying a steam demand to the respective turbine discharge system; a second step of calculating a steam division to the respective turbines by using the dynamic programming based on a set of the steam amount, generation output power and steam division obtained by the first step at each turbine discharge system to maximize a total generation power output from the turbines corresponding to a total input steam amount to all the turbines; and a third step of calculating, by using one of a linear programming and a nonlinear programming, a supply fuel division to the respective boilers and total fuel cost with respect to each set of the total input steam amount, total generation output power and steam division to the respective turbines.

According to the present invention, there is provided a plant utility optimizing system adapted to be connected to a power generation plant including boilers for generating steams, turbines driven by the steams generated from the boilers, a steam header for collecting the steams generated from the boilers, distributing steams by a given ratio and supplying distributed steams to the turbines, and electric power generators driven by the turbines, the plant utility optimizing system comprising turbine output maximum point calculating means for calculating a division ratio of the steam header to maximize a total output amount of the turbines with respect to a given total amount of steam, the calculating means using a dynamic programming scheme; fuel cost minimizing point calculating means for calculating respective amounts of steams to be generated from each of the boilers at a minimum fuel cost based on the given total amount of steam and the division ratio of the steam header calculated by said turbine output maximum point calculating means, the calculating means using a linear programming scheme; and total energy cost minimizing point calculating means for calculating a total energy cost minimum operation point based on an electric power demand, the given total amount of steam, the division ratio of the steam header calculated by said turbine output maximum point calculating means, and the amounts of steams to be generated from the boilers calculated by said fuel cost minimizing point calculating means.

According to the plant utility optimizing method and apparatus of the present invention, process side demands for the plant can be satisfied and an optimum operating point considering the non-convex plant characteristics can be accurately found.

Further, the plant utility optimizing method and apparatus of the present invention can obtain a solution with higher accuracy than in a conventional one and can obviate the need to tune the calculation parameters and, in addition, enables the user-operator with no expert's knowledge on optimization calculation to change the system of the plant and do a system maintenance such as modification of a plant model corresponding to the system change.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 8 shows a table of an optimum steam division and output power to each steam amount of a header L3 included in the energy plant system of the second embodiment;

FIG. 9 shows a table of an optimum steam division and output power to each steam amount of a header L4 included in the energy plant system of the second embodiment;

FIG. 10 shows a table formed by adding a value "u" to each column of the table shown in FIG. 8;

FIG. 11 shows a table formed by adding a value "v" to each column of the table shown in FIG. 9;

FIG. 12 shows a table formed by extracting columns of the table shown in FIG. 10 in which the steam amount of the header L3 satisfies the steam demand SD1 for the L3 system;

FIG. 13 shows a table formed by extracting columns of the table shown in FIG. 11 in which the steam amount of the header L4 satisfies the steam demand SD2 for the L4 system;

FIG. 15 shows a table formed by merging the tables shown in FIGS. 12 and 13;

FIG. 16 shows a table formed by adding a fuel division and a total fuel cost to the table shown in FIG. 15;

FIG. 17 shows a table formed by adding a total cost to the table shown in FIG. 16;

FIG. 20 shows an incoming fuel amount/steam output amount characteristic of the boiler in the BTG plant;

FIG. 21 shows an incoming steam amount/power output characteristic of the turbine in the BTG plant;

FIG. 22 is a view showing an example of the operation of two turbines of the same characteristics;

FIG. 23 is a characteristic showing a relation of an incoming steam amount to a power generation efficiency;

DETAILED DESCRIPTION OF THE INVENTION

A preferred embodiment of an apparatus and method for optimizing a Boiler-Turbine-Generator plant according to the present invention will now be described with reference to the accompanying drawings.

First, a brief explanation of the optimizing system for the BTG plant according to the present invention will be given. The BTG plant supplies extracted/exhausted steams and the electric power which meets the process side demand.

The plant utility optimizing system of the present embodiment is directed to, while satisfying the steam demand and power demand as well as various kinds of restriction requirements, satisfying an operation condition at a minimum total cost through the utilization of a dynamic programming scheme. Therefore, the total cost required for the operation of the plant is minimized.

The dynamic programming scheme is one procedure for solving a decision problem in which an optimum solution is determined in a multistage manner with a result of its analysis at one stage providing a precondition to its sequential decision stage. In the dynamic programming scheme, a decision selection sequence for a realizable optimum solution is called a "policy" and the policy of maximizing a specific function (criterion function) of a final state variable is called as an "optimal policy". The dynamic programming scheme utilizes the "principle of optimality" throughout in which the optimal policy has the property that, whatever an initial state and initial decision are, a subsequent decision sequence has to be given the optimal policy with respect to a state produced as a result of the initial decision. The dynamic programming scheme is well known in the art so that the detailed explanation thereof will be omitted.

In an actual plant dealt with in the present embodiment, it is necessary that an optimum solution be found under the complex restriction conditions because of the reutilization of the steam, the presence of a boiler group, the presence of various steam headers, etc. It is not possible to derive an optimum solution by the conventional dynamic programming scheme.

According to the plant utility optimizing system of the present embodiment, not only means for optimizing the steam output from the turbines but also various optimizing means are suitably combined in accordance with the arrangement of the plant. Therefore, it is possible to find an optimum operation condition of the plant satisfying a complex demand. The plant utility optimizing system of the present embodiment will be explained below in more detail.

First Embodiment

A first embodiment of the present invention will be explained below with reference to the accompanying drawings.

Figure 1:
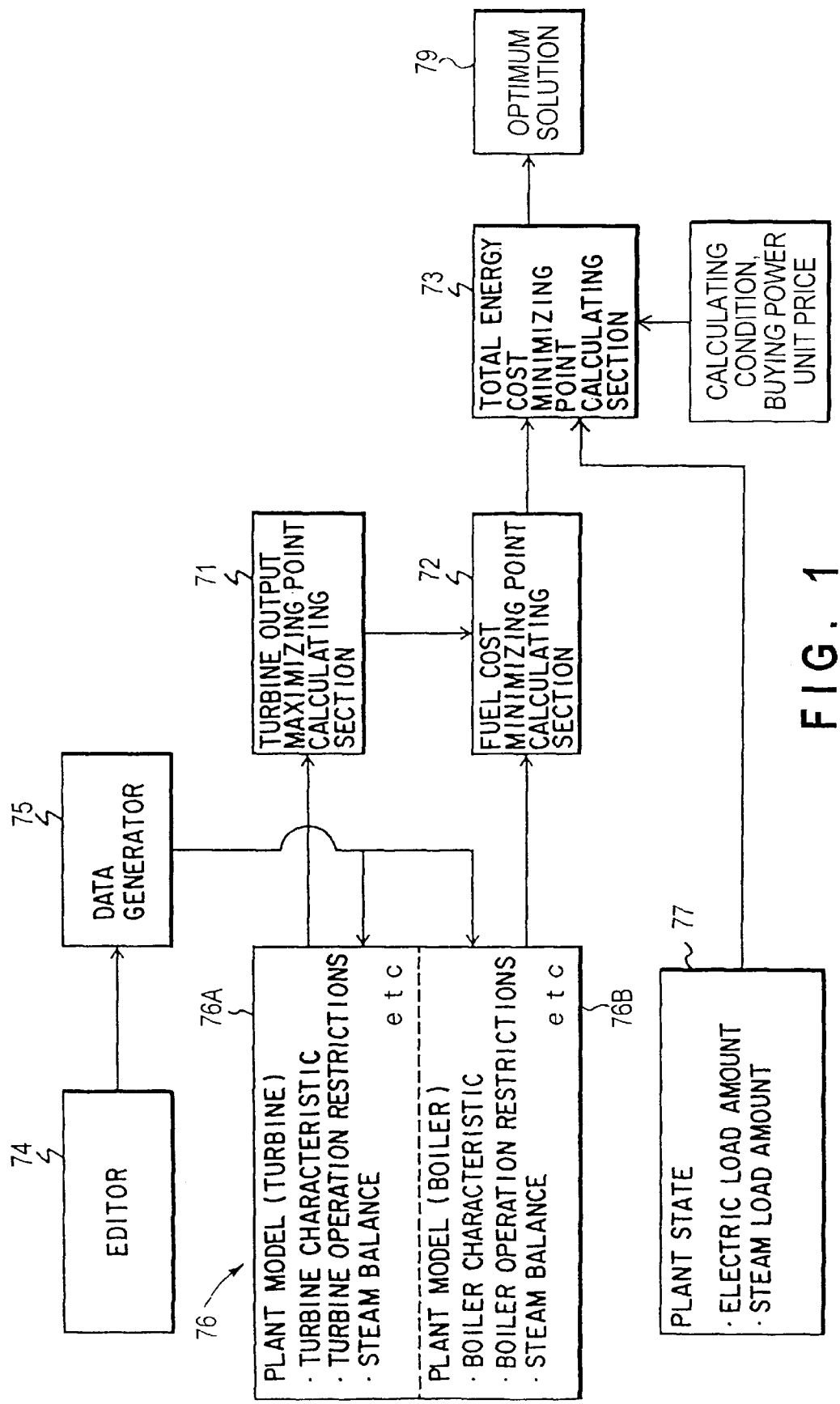
FIG. 1 is a block diagram showing a plant utility optimizing system of a power generation plant (BTG plant) according to a first embodiment of the present invention.
Figure 19:
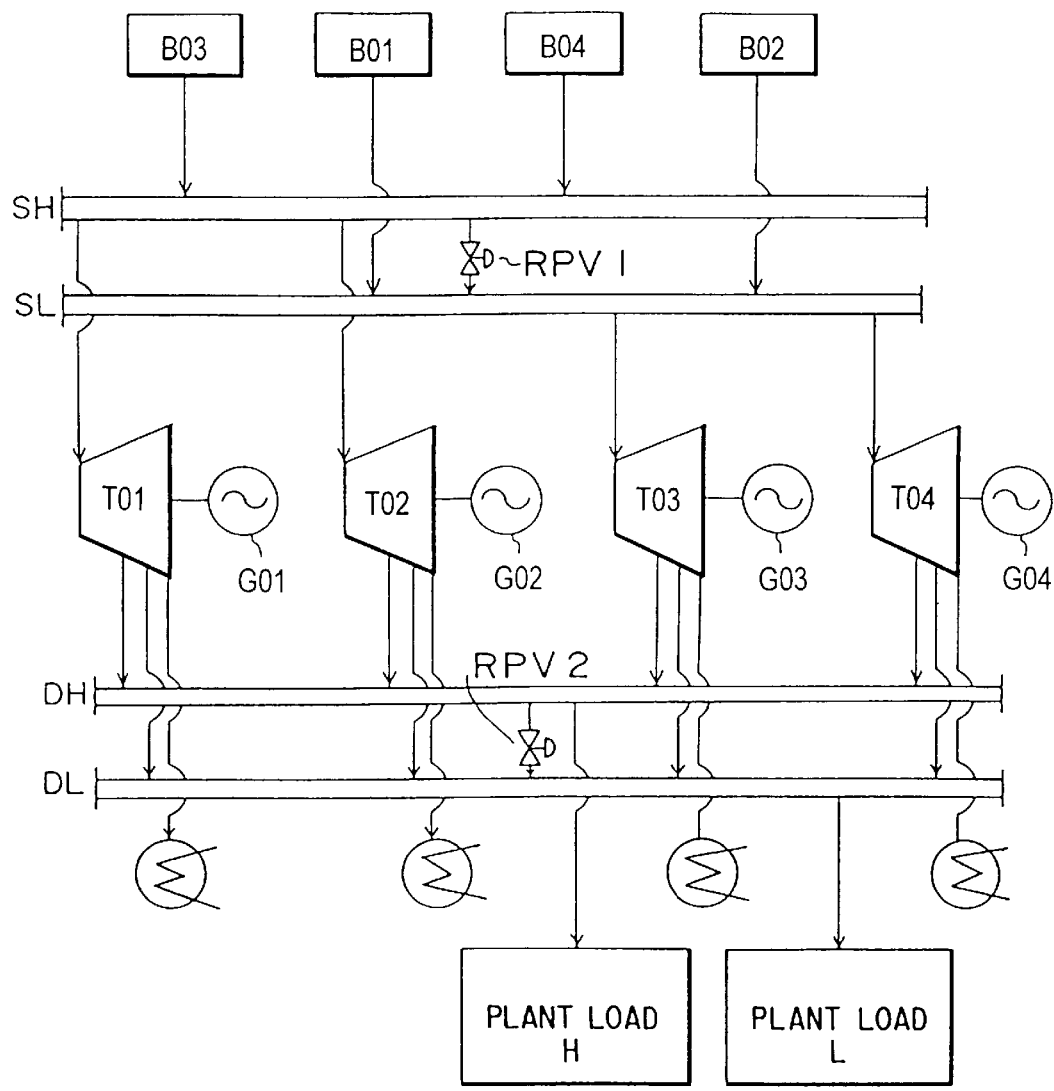
FIG. 19 shows a detailed block diagram showing a main part of the BTG plant shown in FIG. 18.
Figure 24:
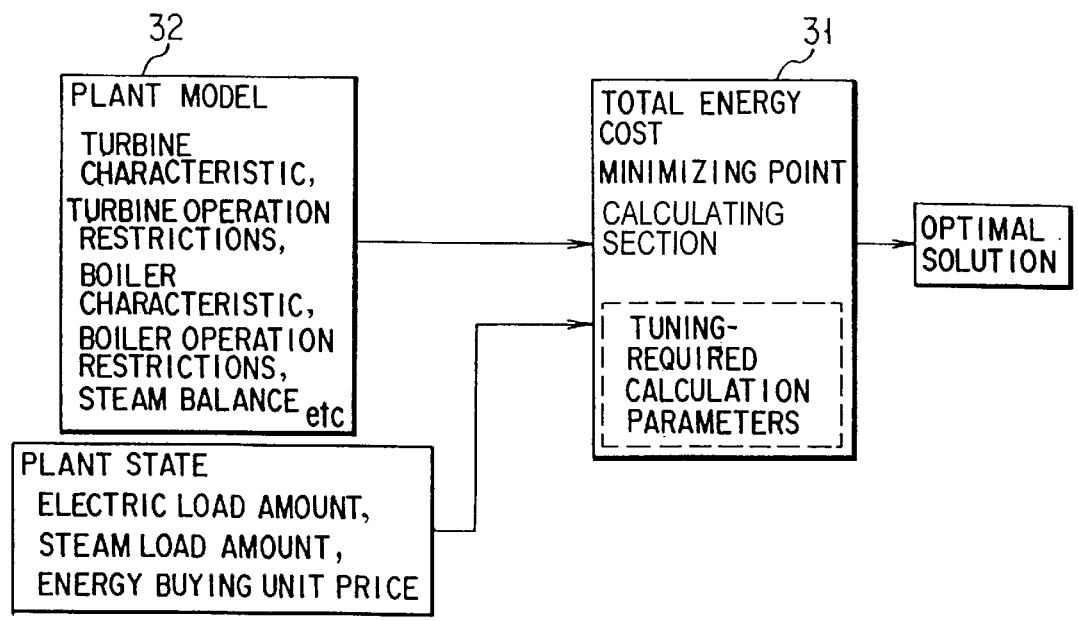
FIG. 24 is a block diagram showing a schematic configuration of an optimizing system of the conventional BTG plant.
Figure 26:
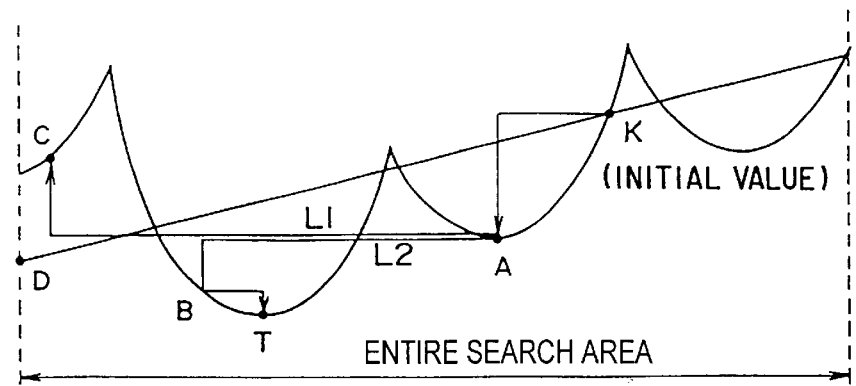
FIG. 26 is a view showing a relation of a linear solution, non-linear solution and true optimum solution to the non-linearity of a valve point characteristic of the turbine.
Figure 25:
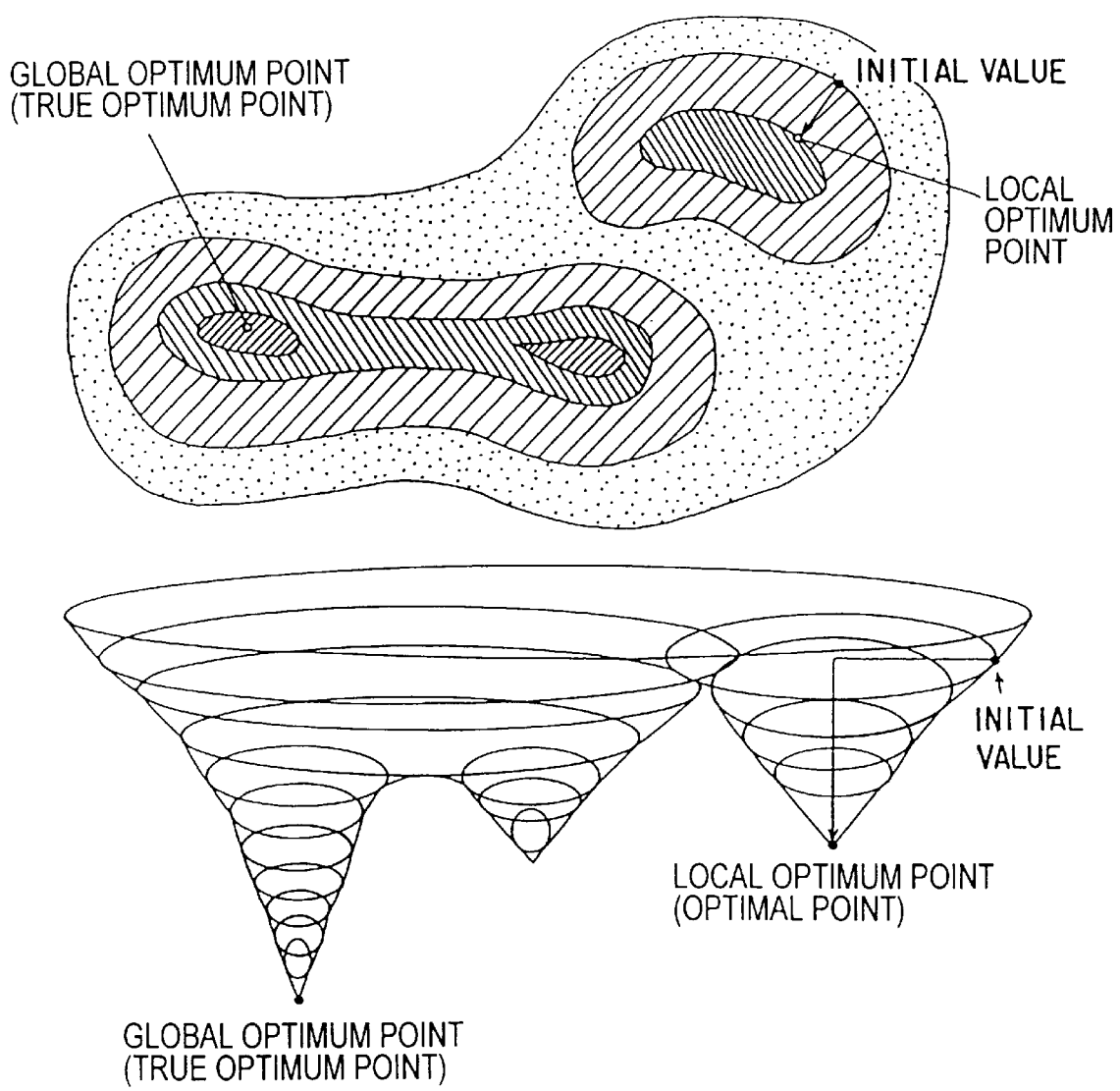
FIG. 25 is a view showing a concept of a local optimum solution and a global optimum solution to the non-linearity of a valve point characteristic of the turbine.

FIG. 1 is a function block diagram schematically showing the first embodiment of the plant utility optimizing system for a Boiler-Turbine-Generator plant (BTG plant). A BTG plant is shown in FIG. 19.

In the first embodiment, a plant model 76 is expressed by a combination of two models; one is a turbine model 76A and other is a boiler model 76B. The turbine characteristic, turbine operable limits, steam balance equations, etc. generated by a data generator 75 in response to an input from an editor 74 are supplied to the turbine model 76A and the boiler operation, boiler operable limits, steam balance equations, etc. generated by the data generator 75 are supplied to the boiler model 76B.

A turbine output maximizing point calculating section 71 determines the dividing ratio of the steam supplied to each turbine to maximize the total power output on each amount of total supplied steam of each pressure by using the turbine model. A fuel cost minimizing point calculating section 72 determines a dividing ratio of the steam supplied from each boiler on each amount of total supplied steam of each pressure.

A total energy cost minimizing point calculating section 73 calculates an operable point at which a total energy cost is minimum when the process load including a buying power unit price as a process side demand is supplied.

An editor 74 changes the plant model 76. The editor 74 includes a plant model creating means for creating/editing the schematic steam flow line diagram, turbines, boilers, and for modifying/altering the mathematical model utilized at the turbine output maximizing point calculating section 71 and fuel cost minimizing point calculating section 72. A data generator 75 can convert the data, which is necessary for the turbine output maximizing point calculating section 71 and fuel cost minimizing point calculating section 72, from the editor 74 to a suitable format for calculation.

The function of the optimizing system of the BTG plant according to the first embodiment will be explained below.

The turbine output maximizing point calculating section 71 determines the division ratio of the steams supplied to the turbines, which maximizes a total power output from the turbines. Steam demand of each pressure rate is given to the section 71.

In order to find the optimum steam division ratio, the most primitive method for finding a global optimum point is an all-points checking method in which all of the possible points are checked one by one. In this method, the steam supply total amount is divided between the lower limit and the upper limit by a given step. The number of divisions is about a hundred which is sufficiently larger than the number of valve points (about 3 to 5 for an industrial turbine) of the turbine characteristic. In the all-points checking method, a vast number of times of calculations is necessary and a difficulty is encountered in actual practice.

Therefore, according to the present invention, DP method (dynamic programming scheme: successive optimizing scheme) is used as means for obtaining a maximum point in less number of times.

The dynamic programming calculation finds a maximum point for each of a hundred of input steam amounts between the lower limit and the upper limit in a short period of time.

The fuel cost minimizing point calculating section 72 determines the amounts of steams to be generated by each boiler so as to generate, at a minimum cost, the total amount of steams generated by the boilers. In this case, the unit cost of the fuel does not vary in time as in the case of the unit cost of the electric power and therefore can be supplied as a fixed value and, if the need arises, can be manually changed.

Since the boiler characteristic is substantially flat as described above, and a linear approximation does not lower the accuracy of the resultant solution, the fuel cost minimizing point calculating section 72 uses a linear programming scheme which is quicker in calculation speed.

With the use of a division ratio table in which a power generation amount is maximum at a minimum fuel cost and which is obtained by the fuel cost minimizing point calculating section 72, the total energy minimizing point calculating section 73 finds a total energy cost, at the time of giving a load power amount, with each of the steam amount total sums as follows:

$$C = Et(Pl - Pg) + Cf$$

wherein

C: total energy cost per hour

Et: buying power cost per KWH

Pl: power demand (kW)

Pg: generating power (kW)

Cf: fuel cost per hour

An optimum division point is found by rearranging the total energy costs C in an ascending order and, checking to see whether or not the load steam supply amount total sum of each pressure satisfies the load steam amount total sum. The initially satisfied point is found as the optimum division point.

By the above operation, it is possible to obtain a power/steam optimum division ratio with respect to the power load and steam load.

If the optimizing model is to be altered in accordance with the system change and apparatus's expansion of the object energy plant as well as the change of the apparatus specification, characteristic variation, etc., the user-operator draws a steam system diagram by using the editor 74 in an "CAD" feeling and inputs the apparatus characteristic, rating, etc., based on the steam system diagram.

In this case, it is possible for the user-operator to edit the operation restriction condition, equality restriction, inequality-restricted conditional equation through the editor 74 in the "word processing" feeling.

Upon receipt of the system diagram, apparatus data and restricted conditional equation prepared by the editor 74, the data generator 75 automatically generates data necessary for optimization calculation from these information items in a form fit for an solution, so that the plant model 76 is altered.

In this case, the optimum calculation logic is separated from a data description portion such as the system configuration, characteristics and restriction condition and, with the use of a system not requiring any timing parameters in the optimum solution method, the system maintenance can be achieved simply by modifying the model.

According to the first embodiment, by separating the steam division calculating means (turbine output maximizing point calculating section 71) regarding to the turbine having the non-linear characteristic and generation steam division calculation means (fuel cost minimizing point calculating section 72) regarding to the boiler having the convex characteristic and allowing linear approximation easily, it is possible to, upon calculation of the steam division ratio to the turbines, apply the sequential calculation procedure (dynamic programming), allowing a global optimum solution equivalent to an all-point search, which is carried out with far less number of calculation times than that necessary for the all-point search. It is, therefore, possible to obtain a solution with improved accuracy and, further, to employ a high-speed linear programming scheme (linear programming scheme) relative to the generation steam division of the boiler.

By adopting the two-step processing, it is possible to correctly get the global optimum point for a turbine having a non-linear valve point characteristic and, in addition, achieve a system not requiring any special search logic and parameter tuning adjustment, so that optimum calculation can be carried out based on the user-operator's altered model.

According to the first embodiment of the present invention, a solution can be obtained with higher accuracy than according to the conventional system. Further, it is not necessary to tune the calculation parameters. Thus, the user-operator without expert's knowledge on the optimization calculation can carry out the system modification of the object energy plant as well as the system maintenance such as the modification of the plant model corresponding to the apparatus modification.

Second Embodiment

Other embodiments of the plant utility optimizing system according to the present invention will be described. The same portions as those of the first embodiment will be indicated in the same reference numerals and their detailed description will be omitted.

According to the plant utility optimizing system of the second embodiment, not only means for optimizing the steam output of the turbine group but also various optimizing means are suitably combined along the arrangement of the plant. Therefore, it is possible to find an optimum operation condition of the plant satisfying a complex demand. Briefly stated, first the processing utilizing the dynamic programming scheme is performed twice and processing utilizing the linear programming scheme is performed once to find optimal solutions (that is, optimum solution candidates) for optimizing the steam outputs of the turbine group corresponding to respective operation conditions and then determines, as an optimum solution, an operation condition for minimizing the total cost.

Figure 2:
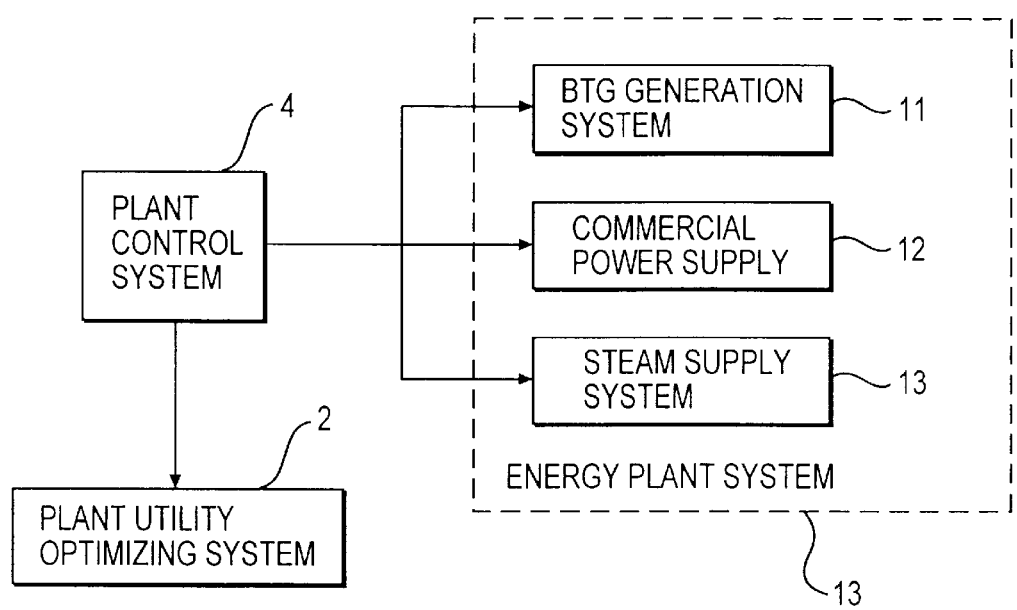
FIG. 2 diagrammatically shows a plant including a plant utility optimizing system according to a second embodiment of the present invention.

FIG. 2 is a diagrammatic view showing a plant including a plant utility optimizing system according to the second embodiment. The plant comprises an energy plant system 6, a plant control system 4 and a plant utility optimizing system 2. The energy plant system 6 includes an BTG power generation system 11, a commercial (or buying) power supply 12 and a steam supply system 13. The plant control system 4 controls the energy plant system 6. The plant utility optimizing system 2 is connected to the plant control system 4 and finds an optimum operation point (division ratio) of the respective components in the energy plant system 6 and transfers the optimum operation division ratio to the plant control system 4.

Instead of being connected to the plant control system 4, the plant utility optimizing system 2 may be provided in a standalone manner. The output of the plant utility optimizing system 2 may be supplied to the plant control system 4 via an information storage medium such as a magnetic disk.

Figure 3:
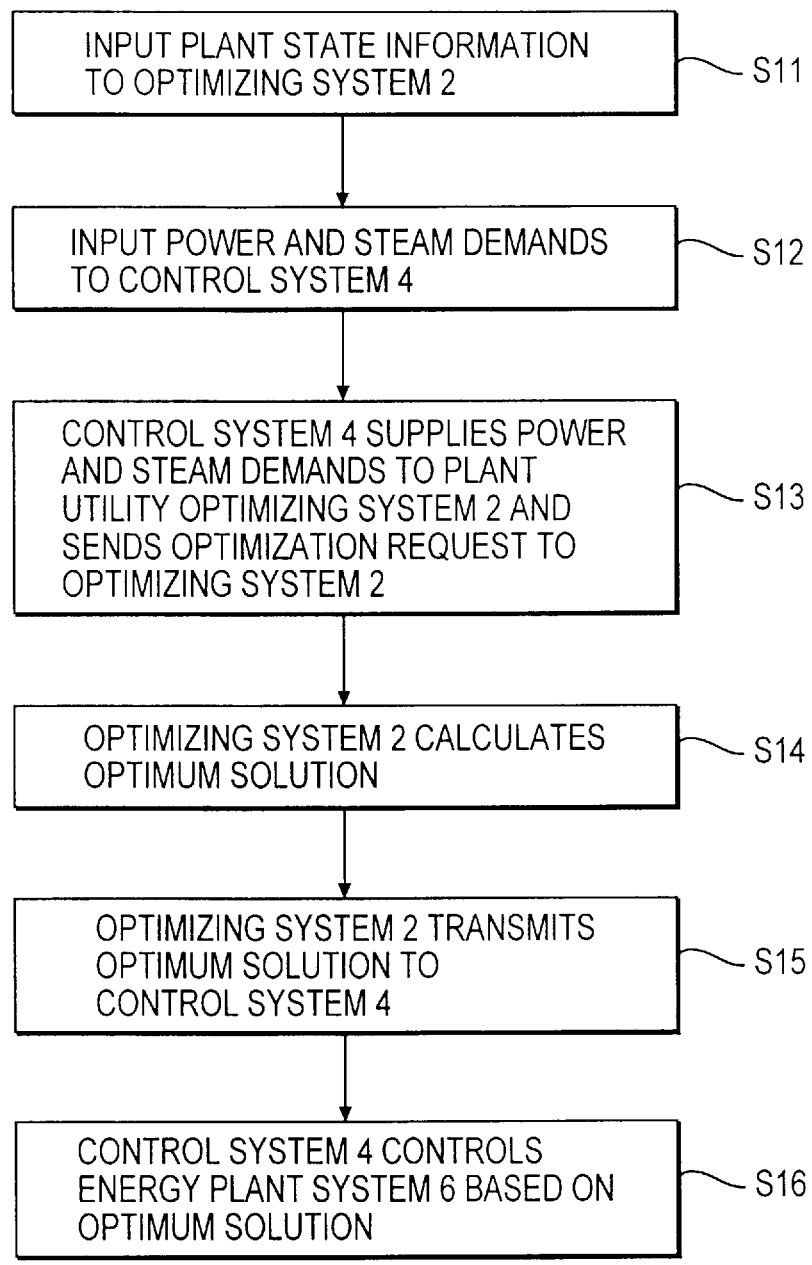
FIG. 3 shows an example of the flow of processing regarding the plant utility optimizing system of the second embodiment.

FIG. 3 shows an example of the flow of processing regarding the plant utility optimizing system 2.

Detailed plant state information of the energy plant system 6 is input to the plant utility optimizing system 2 (step S11).

A power demand and a steam demand are input to the plant control system 4 (step S12) from an input device (not shown).

At step S13, the control system 4 supplies the power demand and the steam demand to the plant utility optimizing system 2 and sends an optimization request to the plant utility optimizing system 2.

The plant utility optimizing system 2 calculates an optimum solution based on the power/steam demand (step S14).

The plant utility optimizing system 2 transmits the optimum solution to the plant control system 4 (step S15).

Based on the optimum solution supplied from the plant utility optimizing system 2, the plant control system 4 controls the energy plant system 6 (step S16).

Figure 4:
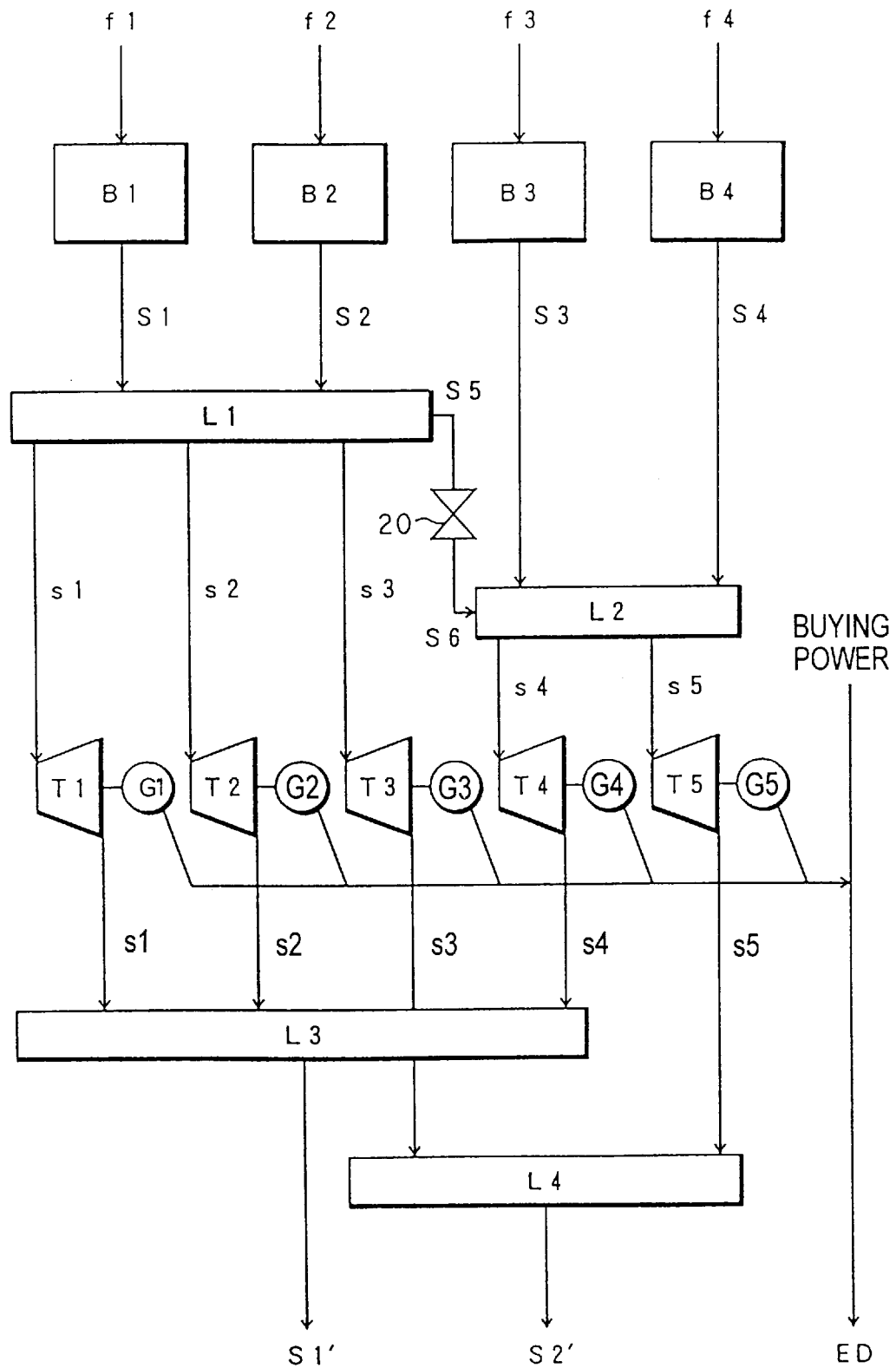
FIG. 4 shows a detail of an energy plant system of the second embodiment.

FIG. 4 shows a detail of the energy plant system 6 in FIG. 2.

The present embodiment has four steam generation boilers (hereinafter referred to as boilers) B1 to B4, five steam turbines (hereinafter referred to as turbines) T1 to T5 and five generators G1 to G5.

The boilers B1 to B4 respectively generate steams with the use of fuels. Fuel amounts fed to the respective boilers B1 to B4 are represented by f1 to f4 and generation steam amounts from the boilers B1 to B4 are represented by S1 to S4.

The output steams S1 and S2 from the boilers B1 and B2 are supplied to a high-pressure steam header L1. The output steam S6 of a pressure reducing valve 20 receiving the output steam S5 of the high-pressure steam header L1 and output steams S3 and S4 from the boilers B3 and B4 are supplied to a high-pressure steam header L2. The high-pressure steam headers L1 and L2 have different pressures (L1 is on the high pressure side).

The output steams s1 to s3 from the high-pressure steam header L1 are respectively supplied to the turbines T1 to T3. The output steams s4 and s5 from the high-pressure steam header L2 are respectively supplied to the turbines T4 and T5. Characteristics of the turbines T1 to T5, i.e., incoming steam amount/generating power output characteristics are represented by p1 to p5, respectively.

The output steams from the turbines T1, T2 and T4 are supplied to a load steam header L3. The output steams from the turbines T3 and T5 are supplied to a load steam header L4. Steams S1' and S2' are output from the load steam headers L3 and L4.

The electric powers generated by the generators G1 to G5 driven in accordance with the corresponding steams s1 to s5 and buying power from the commercial power supply are summed and output as a total power ED.

The fuel amounts f1 to f4 input to the boilers B1 to B4 have their upper and lower limit values, respectively. Further restriction is sometimes added as upper and lower limit values of those amounts of fuel input based on the amounts of fuels currently burned at the respective boilers B1 to B4.

Regarding the steam amounts s1 to s5 input to the turbines T1 to T5, their upper and lower limit values are also determined.

In such an energy plant system 6, steam demands SD1 and SD2 (minimum values of S1' and S2') for the respective steam headers L3, L4, as well as an energy demand ED, are determined. If the energy demand is not satisfied with the total generation power of all the generators G1 to G5, a power from a commercial power supply is bought. If the total generation power exceeds the energy demand, any excess power is discarded or sold to others.

Although in the energy plant system 6 of the present embodiment the turbines T1 to T5 have been explained as being not of a bleeding type, a plant system regarding the bleeding turbines can be so configured as to incorporate the bleeding turbines into the same arrangement as shown in FIG. 4 where these bleeding turbines are regarded as being connected in parallel with a plurality of turbines of non-bleeding type.

Figure 5:
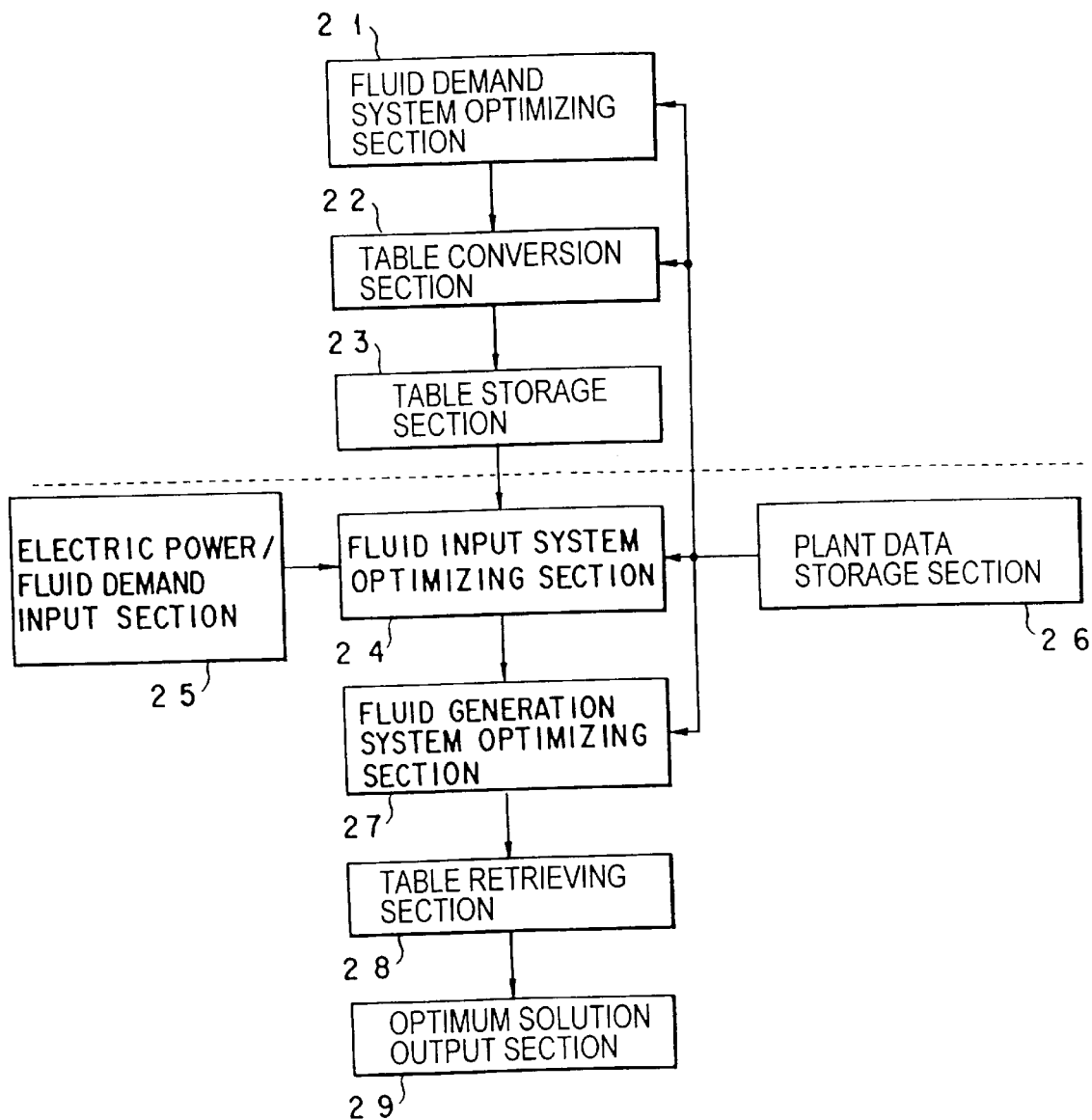
FIG. 5 shows a schematic arrangement of a major portion of the plant utility optimizing system of the second embodiment.

FIG. 5 shows a schematic arrangement of a major portion of the plant utility optimizing system 2 according to the second embodiment. The plant utility optimizing system 2 comprises a fluid demand system optimizing section 21, table conversion section 22, table storage section 23, fluid input system optimizing section 24, power/fluid demand input section 25, plant data storage section 26, fluid generation system optimizing section 27, table retrieving section 28 and optimum solution output section 29.

The plant data storage section 26 stores the upper and lower limit values of the fuel amounts f1 to f4 supplied to the respective boilers B1 to B4, the upper and lower limit values of incoming steam amounts s1 to s5 (discharge steam amounts) of the respective turbines T1 to T5, incoming steam amount/output power characteristics p1 to p5 of the turbines T1 to T5, and other various parameters and functions such as functions of the input/output characteristic of the respective boilers B1 to B4. The plant data storage section 26 supplies, to the fluid demand system optimizing section 21, table conversion section 22, fluid input system optimizing section 24 and fluid generation system optimizing section 27, their demanded numerical values and functions as will be set out below.

First, the fluid demand system optimizing section 21 calculates optimum steam divisions (s1, s2, s4) for the respective turbines T1, T2 and T4 included in the header L3 through the use of the dynamic programming scheme to maximize the total output power generated by the generators G1, G2 and G4 driven by the turbines T1, T2 and T4 for respective steam amounts of the header L3. The optimum steam divisions (s1, s2, s4) are obtained while the steam amount of the header L3 is set to integer values from 0 to M1+M2+M4.

Figure 6:
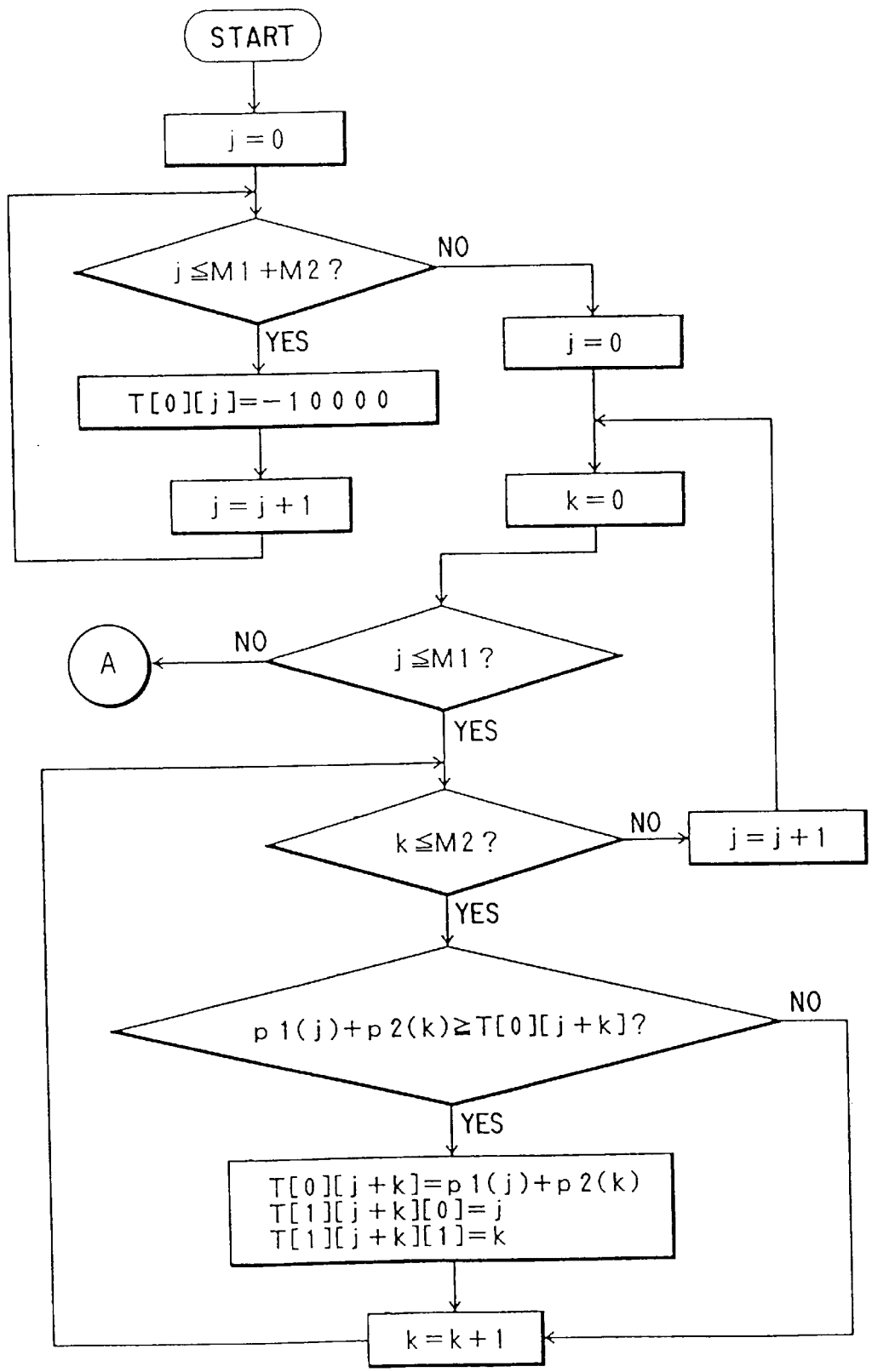
FIGS. 6 and 7 show a flow chart showing one example of the operation of a fluid demand system optimizing section in the plant utility optimizing system of the second embodiment.
Figure 7:
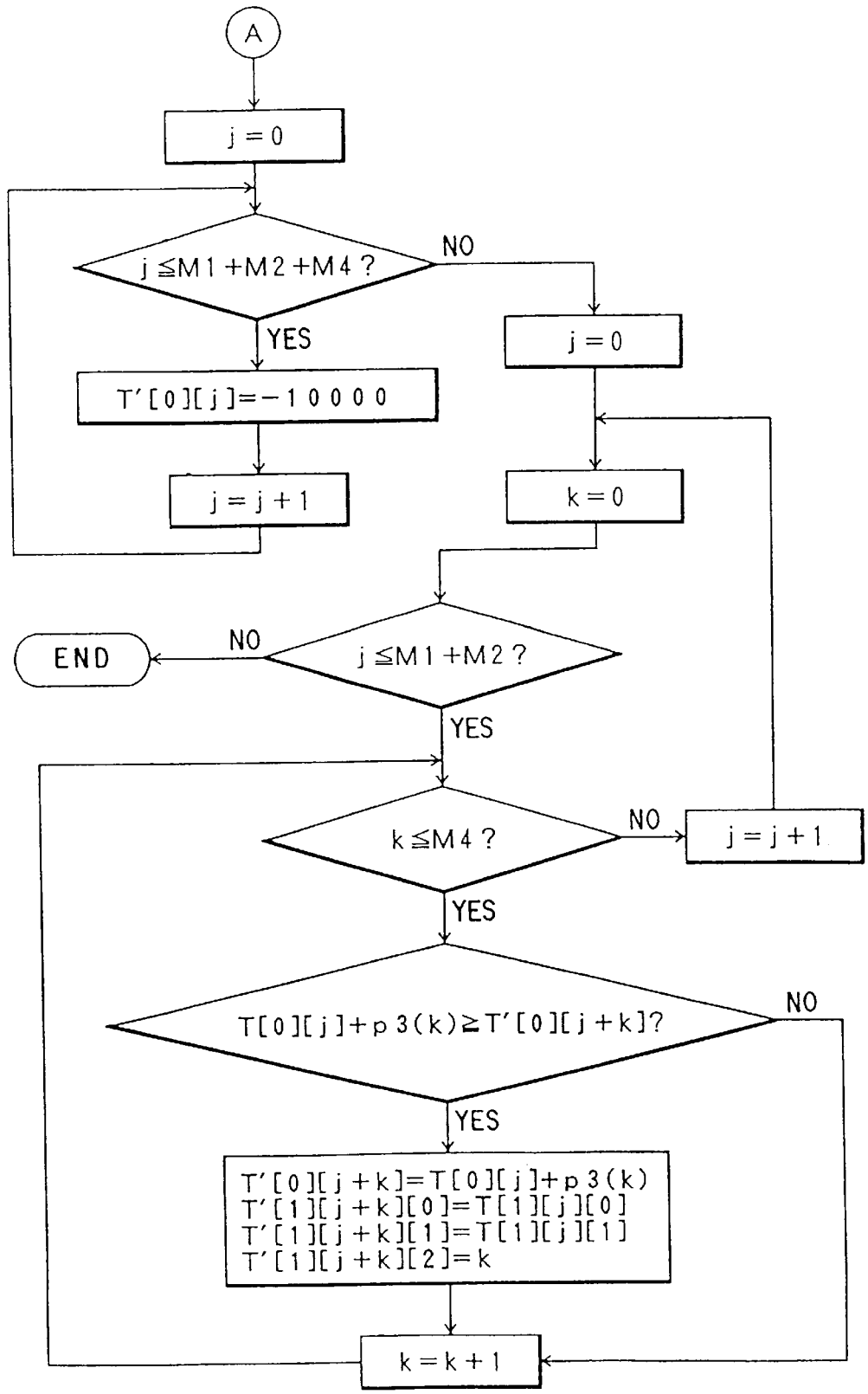

FIGS. 6 and 7 show an example of the operation of the fluid demand system optimizing section 21. The fluid demand system optimizing section 21 obtains an optimum steam division (s1, s2, s4) of the steam header L3 and an optimum steam division (s3, s5) of the steam header L4 by using the dynamic programming scheme. The dynamic programming scheme can obtain an optimum solution between only two variables. Therefore, in order to obtain an optimum solution between three variables (s1, s2, s4), the dynamic programming scheme is performed twice. In FIGS. 6 and 7, p1 to p5 show the characteristic functions of the turbines T1 to T5 and M1 to M5 show the upper limit values of the discharge steam amounts of the respective turbines T1 to T5. For brevity in explanation, it is assumed that M1 to M5 are integers and the lower limit values thereof all zeroes. Further, T and T' represent two-dimensional arrays, a first [ ] following the T and T' represents a row and the next [ ] represents a column, the following [0], [1], [2] representing first, second and third elements in the row/column. The array T [0] [j+k] and T' [0] [j+k] represent output powers for header L3 and L4. The array T [1] [j+k] [0] and T [1] [j+k] [1] represent steam divisions s3 and s5 and the array T' [1] [j+k] [0], T' [1] [j+k] [1], and T' [1] [j+k] [2] represent steam divisions s1, s2 and s4.

A table shown in FIG. 8 is obtained by the operation shown in FIGS. 6 and 7. The table shown in FIG. 8 indicates optimum steam divisions (s1, s2, s4) and a total output power for respective steam amounts of header L3.

Similarly, the fluid demand system optimizing section 21 calculates optimum steam divisions (s3, s5) for the respective turbines T3 and T5 included in the header L4 through the use of the dynamic programming scheme to maximize the total output power generated by the generators G3 and G5 driven by the turbines T3 and T5 for respective steam amounts of the header L4.

This calculation can be indicated by a flow chart similar to that shown in FIGS. 6 and 7 by replacing M1 and M2 with M3 and M5 and by replacing "to A" after step S27 with "END". Stated another way, the steps shown in FIG. 7 is not necessary for this calculation. The optimum steam divisions (s3, s5) are obtained while the steam amount of the header L4 is set to integer values from 0 to M3+M5.

A table shown in FIG. 9 is obtained by this calculation. The table shown in FIG. 9 indicates optimum steam divisions (s3, s5) and a total output power for respective steam amounts of header L4.

The tables shown in FIGS. 8 and 9 are sent to the table conversion section 22.

Here, given that the steam amounts supplied from the boilers B1 to B4 to the L1 and L2 systems are $\alpha 1$, $\alpha 2$, then $$\alpha 1 = S1 + S2$$

$$\alpha 2 = S3 + S4.$$

Thus, the following relations are established.

$$s1 + s2 + s3 = \alpha 1 - S5$$

$$s4 + s5 = \alpha 2 + S6$$

Since a linear relation, $S5 = \lambda \cdot S6$, exists between S5 and S6, an equation $$u+v=\sigma$$

is established.
Here, $$u = s1 + s2 + \lambda \cdot s4$$

$$v = s3 + \lambda \cdot s5$$

$$\sigma = \sigma1 + \lambda \cdot \sigma2$$

where σ represents the total amount of the generated steam expressed in terms of the high pressure steam.

The table conversion section 22 creates a table as shown in FIG. 10 with the value "u" added to each column of the table shown in FIG. 8 and a table as shown in FIG. 11 with the valve "v" added to the table shown in FIG. 9. The value "uM" in FIG. 10 shows a maximum step value not exceeding M1+M2+λ·M4, while the value "vM" in FIG. 11 shows a maximum step value not exceeding M3+λ·M5. The table conversion section 22 sends these tables shown in FIGS. 10 and 11 to the table storage section 23.

Incidentally, creating the tables as shown in FIGS. 10 and 11 by simply adding the values "u" and "v" calculated from the respective steam amounts in the steam system L3 and respective steam amounts in the steam system L4 to the tables shown in FIGS. 8 and 9 results not necessarily in the values "u" and "v" being arranged at regular intervals.

It is preferable that, in order to change the values "u" and "v" with constant intervals, the table conversion section 22 first determines the values "u" and "v" with constant intervals and then interpolates the steam amount, optimum steam division and output power with respect to the values "u" and "v" on the basis of the values shown in FIGS. 8 and 9.

As the interpolation method the followings may be utilized, for instance. If the total steam amount corresponding to the values "u" and "v" exists in the rows of the steam amounts of L3 and L4 of the tables shown in FIGS. 8 and 9, the existing column is used as it is and, if such is not the case, a column of the minimum value of those equal to, or exceeding, the total steam amount is used. This is another linear interpolation method by which, if the total steam amount corresponding to the values "u" and "v" exists in the rows of the steam amounts of L3 and L4 of the tables shown in FIGS. 8 and 9, the existing column is used as it is and, if such is not the case, a linear interpolation is performed using a column of the minimum value of those exceeding the total steam amount and a column of the maximum value of those less than the total steam amount.

The table storage section 23 stores the tables shown in FIGS. 10 and 11.

When the plant system is determined, processing up to this can be performed.

The energy demand and steam demand input from the plant control system 4 are supplied from the power/fluid demand input section 25 to the fluid input system optimizing section 24. Upon receipt of the already prepared tables as shown in FIGS. 10 and 11, from the table storage section 23, the fluid input system optimizing section 24 extracts, from the table shown in FIG. 10, the column in which the steam amount of the header L3 satisfies the steam demand SD1 for the L3 system and, similarly, from the table shown in FIG. 11, the column in which the steam amount of the header L4 satisfies the steam demand SD2 for the L4 system.

The results of extraction are tables shown in FIGS. 12 and 13. It is to be noted that, in the table as shown in FIG. 12, L3l and L3u are lower and upper limit values of the steam amount of L3 shown in FIG. 10 which satisfy the steam demand for the L3 system, Um, (sm1, sm2, sm4) and Em3 corresponds to "u", (s1, s2, s4) and output power in the column of L3l, and UM, (sM1, sM2, sM4) and EM3 corresponds to "u", (s1, s2, s4) and output power in the column of L3u. Similarly, in the table as shown in FIG. 13, L4l and L4u are lower and upper limit values of the steam amount of L4 shown in FIG. 11 which satisfy the steam demand for the L4 system, Vm, (sm3, sm5) and Em4 corresponds to "v", (s3, s5) and output power in the column of L4l, and VM, (sM3, sM5) and EM4 corresponds to "v", (s3, s5) and output power in the column of L4u.

For the case of letting the total input steam amount be respective values in terms of a high pressure level, the fluid input system optimizing section 24 uses the dynamic programming scheme to determine steam divisions s1 to s5 supplied to the turbines T1 to T5 so that the total output power generated by the generators G1 to G5 driven by the turbines T1 to T5 may be maximum, based on the tables shown in FIGS. 12 and 13.

The tables of FIGS. 12 and 13 are regarded as two-dimensional arrays, 4×L1, 4×L2, and referred to as "A" and "B", noting that L1 and L2 represent the lengths of the tables. For example, A[0][L1−1] corresponds to UM. A first [ ]following "A" represents a row and the next [ ] represents a column.

Figure 14:
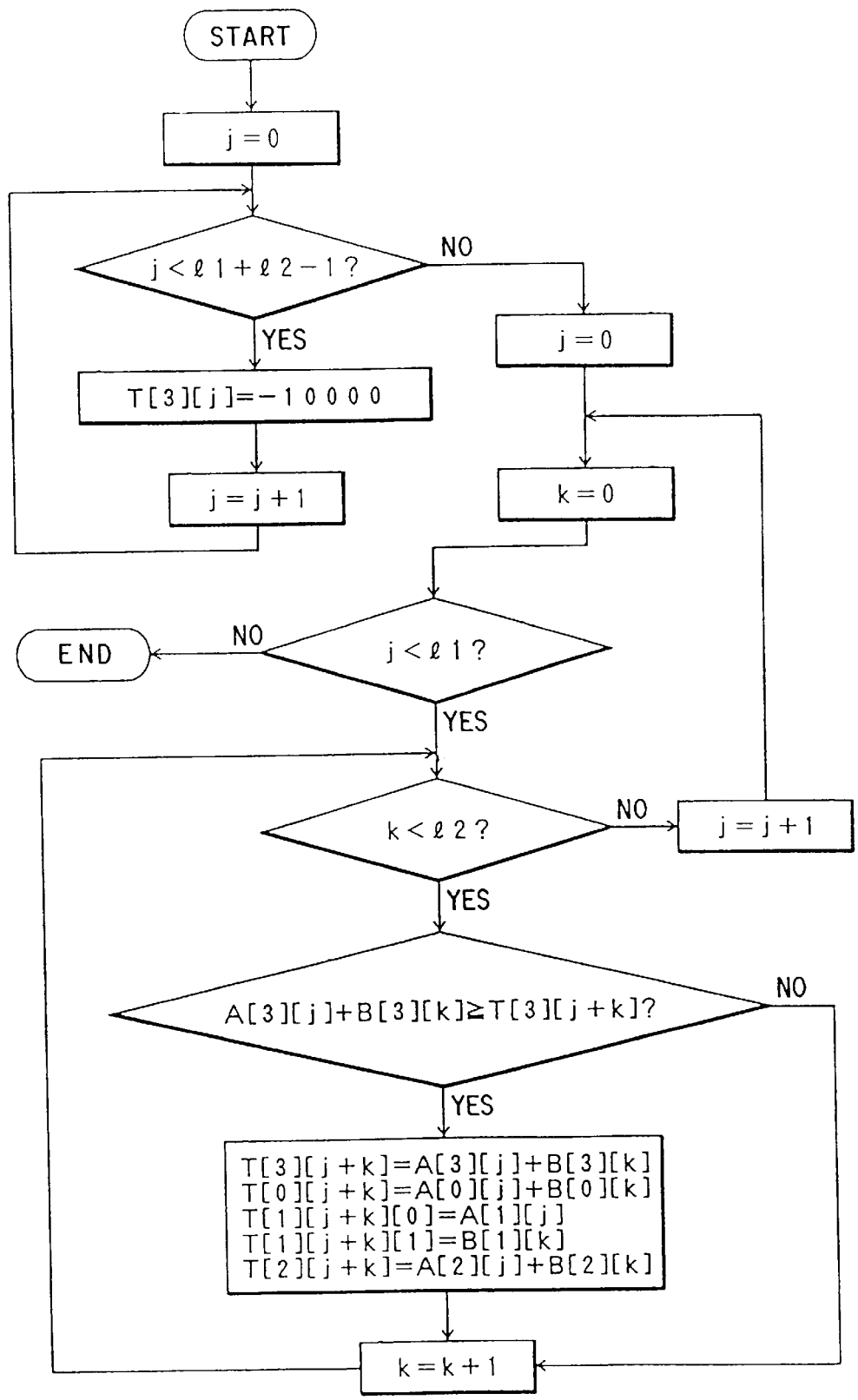
FIG. 14 is a flow chart showing one example of the operation of a fluid input system optimizing section in the plant utility optimizing system of the second embodiment.
Figure 18:
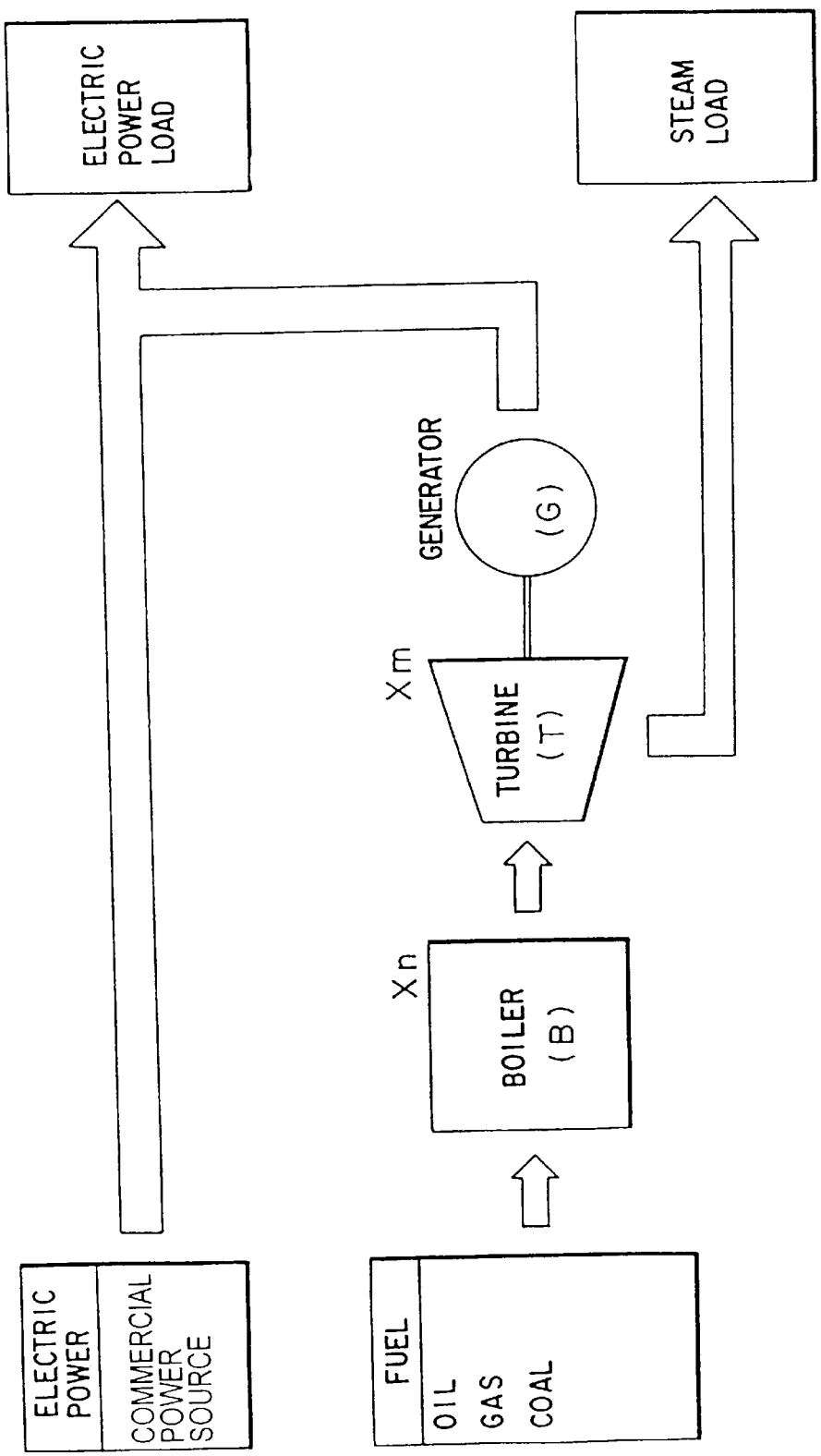
FIG. 18 shows a conceptual diagram of the conventional BTG plant.

FIG. 14 shows the operation of the fluid input system optimizing section 24. In FIG. 14, T represents an array in which a first [ ] and the next [ ] represent the row and column, respectively, with the following [0], [1] representing first and second elements, respectively, in the row/column array.

A[3][j]+B[3][k] in FIG. 14 shows a merge of a table A[3][j] and table B[3][k]. For example, if the elements in the table A[3][j] and those in the table B[3][k] be (a1, a2, a4) and (a3, a5), respectively, and as a result of merging these elements of A[3][j]+B[3][k] becomes (a1, a2, a3, a4, a5).

By the operation as shown in FIG. 14, it is possible to obtain, as an array T, a table as shown in FIG. 15. This table is sent to the fluid generation system optimizing section 27.

In the table shown in FIG. 15, the steam division (s1, s2, s3, s4, s5) with the maximum total power output is obtained with respect to each column, that is, the respective total input steam amounts. Therefore, the steam amounts α1 and α2 flowing through the respective headers L3 and L4 with respect to the respective total input steam amounts are uniquely determined.

Under the condition that the lower and upper values of amounts of fuel, f1 to f4, are satisfied with respect to the respective columns in the table shown in FIG. 15, that is, with respect to the respective total input steam amounts and that the steams of α1 and α2 are supplied to the respective headers L3 and L4, the fluid generation system optimizing section 27 finds a fuel division by which the fuel cost is minimized. The boiler characteristics of the respective boilers B1 to B4 become, in any case, a linear function of the fuel and costs also become a linear function of the fuel. Therefore, the fuel division and fuel cost can be found by the linear or the non-linear programming scheme.

By using the linear programming scheme, those values S1 to S6 and f1 to f4 are found with respect to the respective columns of the table as shown in FIG. 15. The fluid generation system optimizing section 27 creates a table as shown in FIG. 16 by adding the fuel divisions f1 to f4 to the table shown in FIG. 15.

The table is sent to the table retrieving section 28.

At this time, it is possible to obtain operation parameters with which the total output power is maximum with respect to the respective fuel costs. That is, the respective columns of FIG. 16 can be regarded as candidates for an optimum solution.

The table retrieving section 28 determines an optimum solution from the respective candidates shown in FIG. 16.

First, the table retrieving section 28 calculates the total cost, for each column, that is, for each candidate, on the basis of the values on the table shown in FIG. 16.

The total cost is calculated, for example, by the following equation.

"total cost"="total fuel cost"+e(ED−"total output power")

where e: unit price of the commercial power supply

ED: energy demand.

This case is based on the assumption that the total output power is set to be lower than the energy demand. If the total output power exceeds the energy demand, it may set, for example, (ED−"total output power") to be zero. Alternately, if any excess power over the energy demand can be sold, e' may be calculated as a unit value for sale.

If ED≧"the total output power", it may be calculated as

"the total cost"="total fuel cost"+e(ED−"total output power").

If ED <"the total output power", it may be calculated as

"the total cost"="total fuel cost"+e'(ED−"total output power").

The table retrieving section 28 creates a table as shown in FIG. 17 by adding the calculated total cost to the respective column of the table shown in FIG. 16. From this table, a column of the minimum total cost is found and a set of various kinds of values in the column is supplied to the optimum solution output section 29.

The optimum solution output section 29 stores the optimum solution sent from the table retrieving section 28. Out of various values included in the optimum solution, necessary information is sent as optimum operation parameters to the plant control system 4.

According to the plant utility optimizing system of the second embodiment, it is possible to satisfy various demands for the plant system and find optimum operation parameters or conditions reflecting the non-linear characteristic of the turbines. Therefore, the operation cost can be largely reduced in comparison with the conventional system.

Although the second embodiment is explained in connection with the operation of the plant utility optimizing system adapted to be used for the plant system shown in FIG. 4, the present invention can also be applied to the case where the number of the boilers and turbines as well as the kinds of load steam headers are modified.

If sufficient electric power and steam are supplied to the power load and steam only by the independent power generation equipment without the need to buy electric power from a commercial power source, it may be possible to, instead of performing the processing by the table retrieving section 28, find an optimum solution (optimum operation parameters or conditions reflecting the non-linear characteristic) on the basis of the table prepared by the fluid generation system optimizing section 27.

Further, even if other elements are added to the plant system shown in FIG. 4, an optimum solution can be obtained through a slight modification of the plant utility optimizing system 2.

The present invention can be applied not only to the BTG independent power generation system but also generally to the plant system including those elements having the non-linear characteristic.

According to the present invention, in the searching of optimum operation parameters in a BTG plant including a plurality of first plant elements having a linear input/output characteristic with first physical amounts, for example, fuel, as an input and second physical amounts, for example, steam amounts, as an output and a plurality of second plant elements having an input/output characteristic with the second physical amounts as an input, and a third physical amounts, for example, output power, as an output, the latter input/output characteristic containing a non-linear characteristic portion, processing is done twice through the utilization of the dynamic programming allowing the non-linear characteristic to be reflected. Once the first demand (for example, steam demand), that is, a demand for the second physical amounts, is satisfied, sets of the total sum of the second physical amounts, division ratio of this total sum to all the second plant elements and total sum of the third physical amounts output from all the second plant elements are found, noting that the total amount of various second physical amounts is given here.

For each set, the first physical amounts input to the respective second elements and first cost required to supply these first physical amounts are found by a linear or a non-linear programming scheme on the basis of the values in the found set.

Finally, if, for each set, the total sum of the third physical amounts is smaller than a second demand (for example, an energy demand), a second cost (for example, external cost) required to receive its shortage from an outside is calculated on the basis of the values in the set of the total sum of the third physical amounts and first cost (for example, a total fuel cost) required for the first physical amounts thus obtained to find a total cost for each set and a respective value (for example, the total sum of the second physical amounts, division of the second physical amounts to the second plant elements, total sum of the third physical amounts, first physical amounts input to the respective second plant elements, first cost required to supply the first physical amounts, total cost, etc.,) belonging to a set, that is, a set in which that total cost is minimized, is determined as an optimal solution.

According to the plant utility optimizing system of the present invention, it is possible to determine such a steam division (point) of the respective turbines as to maximize a total of the outputs of the respective turbines for each steam supply amount given from the turbine model in the plant model and it is also possible to determine such a steam division ratio of the respective boilers as to generate, at a minimum cost, the total sum of the per pressure steam supply amounts given from the boiler model for each point. By searching a total energy cost minimum operation point (including a power buying cost) for the electric loads and above-mentioned loads it is possible to obtain a true optimum point and largely lower a cost involved.

In addition to the above-mentioned functions, it is also possible to, on the plant model used for calculating the turbine output maximum point and fuel cost minimizing point, prepare/edit the system graphics and system model described with the mathematical expression and generate, from this model, data necessary for optimal calculation. By doing so, it is possible to readily modify or correct the model.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed:

1. A utility optimizing method for calculating optimum operation parameters of a plant including a plurality of first plant elements having a linear input/output characteristic with first physical amounts as an input and second physical amounts as an output and a plurality of second plant elements having a non-convex input/output characteristic with the second physical amounts output from the first plant elements as an input and third physical amounts as an output, the method comprising:

a first step of calculating a division of the second physical amounts to the second plant elements by using a dynamic programming to maximize the total of the third physical amounts output from the second plant elements associated with the total of the second physical amounts in a predetermined range satisfying a first demand for the second physical amounts;

a second step of calculating a division of the second physical amounts to the second plant elements by using a dynamic programming based on a set of the total of the second physical amounts, total of the third physical amounts and division of the second physical amounts to the second plant elements obtained by the first step at each of the second physical amounts to maximize the total of the third physical amounts output from said all the second plant elements and corresponding to the total of the second physical amounts to all the second plant elements;

a third step of calculating, by using one of a linear programming or a nonlinear programming, the second physical amounts input to the respective second plant elements and a first cost required to supply the first physical amounts with respect to each set of the total of the second physical amounts, total of the third physical amounts and division of the second physical amounts to the second plant elements obtained by the second step; and a fourth step of, based on each set of the total of the third physical amounts and first cost obtained at the third step, calculating a second cost required to receive a power which corresponds to a shortage in a second power demand for the total of the third physical amounts from an external source to calculate a total cost for each set and obtaining, as an optimum solution, each value belonging to a set in which the total cost is minimized.

2. A utility optimizing method for calculating optimum operation parameters of a plant including a plurality of first plant elements having a linear input/output characteristic with first physical amounts as an input and second physical amounts as an output and a plurality of second plant elements having a non-convex input/output characteristic with the second physical amounts output from the first plant elements as an input and third physical amounts as an output, the method comprising:

a first step of calculating a division of the second physical amounts to the second plant elements by using a dynamic programming to maximize the total of the third physical amounts output from the second plant elements associated with the group corresponding to the total of the second physical amounts in a predetermined range satisfying a first demand for a group of second physical amounts;

a second step of calculating a division of the second physical amounts to the second plant elements by using a dynamic programming based on a set of the total of the second physical amounts, total of the third physical amounts and division of the second physical amounts to the second plant elements obtained by the first step at each of the second physical amounts in a group to maximize the total of the third physical amounts output from said all the second plant elements and corresponding to the total of the second physical amounts to all the second plant elements;

a third step of calculating, by using one of a linear programming or a nonlinear programming, the second physical amounts input to the respective second plant elements and a first cost required to supply the first physical amounts with respect to each set of the total of the second physical amounts, total of the third physical amounts and division of the second physical amounts to the second plant elements obtained by the second step; and a fourth step of, based on each set of the total of the third physical amounts and first cost obtained at the third step, calculating a second cost required to receive a power which corresponds to a shortage in a second power demand for the total of the third physical amounts from an external source to calculate a total cost for each set and obtaining, as an optimum solution, each value belonging to a set in which the total cost is minimized.

3. The method according to claim 2, wherein when, in the fourth step, the total of the third physical amounts exceeds the second power demand, the second cost is made zero or the second cost is made to a negative value when the second cost is obtained by selling an excess of the total of the third physical amounts over the second power demand.

4. A utility optimizing method for calculating optimum operation parameters of a power generation plant including a plurality of boilers, a plurality of turbines operated by steams generated from the boilers and generators driven by the respective turbines to generate electric power in which the electric power is supplied to electric power loads while the steams generated from the respective turbines are supplied to steam loads via a plurality of turbine discharge systems, the method comprising:

a first step of calculating a steam division to the respective turbine by using a dynamic programming to maximize the total of the generation powers of the turbines connected to the same turbine discharge system corresponding to the steam amounts in a predetermined range satisfying a steam demand to the respective turbine discharge system;

a second step of calculating a steam division to the respective turbines by using the dynamic programming based on a set of the steam amount, generation output power and steam division obtained by the first step at each turbine discharge system to maximize a total generation power output from the turbines corresponding to a total input steam amount to all the turbines; and a third step of calculating, by using one of a linear programming and a nonlinear programming, a supply fuel division to the respective boilers and total fuel cost with respect to each set of the total input steam amount, total generation output power and steam division to the respective turbines.

5. A utility optimizing method according to claim 4, further comprising:

a fourth step of, based on each set of a total generation output power and total fuel cost obtained by the third step, calculating an external cost required to receive a power which corresponds to a shortage in a power demand for the total generation output power from an outside source to calculate a total cost for each set and obtaining, as an optimum solution, each value belonging to a set in which the total cost is minimized.

6. The method according to claim 5 wherein when, in the fourth step, the total of the third physical amounts exceeds the second power demand, the second cost is made zero or the second cost is made to a negative value when the second cost is obtained by selling an excess of the total of the third physical amounts over the second power demand.

7. A plant utility optimizing system adapted to be connected to a power generation plant including boilers for generating steams, turbines driven by the steams generated from the boilers, a steam header for collecting the steams generated from the boilers, distributing steams by a given ratio and supplying distributed steams to the turbines, and electric power generators driven by the turbines, the plant utility optimizing system comprising:

turbine output maximum point calculating means for calculating a division ratio of the steam header to maximize a total output amount of the turbines with respect to a given total amount of steam, the calculating means using a dynamic programming scheme;

fuel cost minimizing point calculating means for calculating respective amounts of steams to be generated from each of the boilers at a minimum fuel cost based on the given total amount of steam and the division ratio of the steam header calculated by said turbine output maximum point calculating means, the calculating means using a linear programming scheme; and total energy cost minimizing point calculating means for calculating a total energy cost minimum operation point based on an electric power demand, the given total amount of steam, the division ratio of the steam header calculated by said turbine output maximum point calculating means, and the amounts of steams to be generated from the boilers calculated by said fuel cost minimizing point calculating means.

8. The plant utility optimizing system according to claim 7, further comprising:

plant model creating means for creating/editing system graphics for indicating a model of the power generation plant; and data generating means, based on the model, for generating data necessary for calculations by said turbine output maximum point calculating means, said fuel cost minimizing point calculating means, and said total energy cost minimizing point calculating means.

* * * * *

UNITED STATES PATENT AND TRADEMARK OFFICE
CERTIFICATE OF CORRECTION

PATENT NO. : 5,886,895
DATED : March 23, 1999
INVENTOR(S) : Yoichi KITA et al.

It is certified that error appears in the above-indentified patent and that said Letters Patent is hereby corrected as shown below:

Title page, Item [22], delete " Filed: July 1, 1996" and insert the following PCT data which was omitted from the patent:

[22] PCT Filed: September 26, 1995

[86] PCT No.: PCT/JP95/01945

§ 371 Date: July 1, 1996

§ 102(e) Date: July 1, 1996

[87] PCT Pub. No.: WO96/10219

PCT Pub. Date: April 4, 1996

Signed and Sealed this

Twenty-sixth Day of October, 1999

*Attest:*

Q. TODD DICKINSON

*Attesting Officer*  *Acting Commissioner of Patents and Trademarks*